(12) United States Patent
Hu (10) Patent No.: US 6,264,912 B1
(45) Date of Patent: Jul. 24, 2001

(54) METHODS FOR PRODUCING MONODISPERSED PARTICLES OF BARIUM TITANATE

(75) Inventor: Zhong-Cheng Hu, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 09/393,954

(22) Filed: Sep. 10, 1999

(51) Int. Cl.[7] .......................... C01G 23/00; C01G 25/00; C01G 27/00; C22B 34/10
(52) U.S. Cl. .............................. 423/598; 423/593; 423/69
(58) Field of Search .................................. 423/593, 598, 423/69; 502/340, 350

(56) References Cited

U.S. PATENT DOCUMENTS

| | | | |
|---|---|---|---|
| 3,725,539 | * 4/1973 | Spangenberg | 423/598 |
| 4,293,534 | * 10/1981 | Arendt | 423/593 |
| 4,487,755 | * 12/1984 | Arendt | 423/598 |
| 4,534,956 | * 8/1985 | Arendt | 423/598 |
| 4,755,373 | * 7/1988 | Gherardi et al. | 423/598 |
| 4,829,033 | * 5/1989 | Menashi et al. | 501/139 |
| 4,832,939 | * 5/1989 | Menashi et al. | 423/598 |
| 4,898,843 | * 2/1990 | Matushita et al. | 501/136 |

(List continued on next page.)

OTHER PUBLICATIONS

Frank Dachille et al "Pressure–Temperature Studies of Anatase, Brookite, Rutile and $TiO_2II$," The American Mineralogist, vol. 53, Nov.–Dec., p. 1929–1939, 1968.

James O. Eckert, Jr. et al "Kinetics and Mechanisms of Hydrothermal Synthesis of Barium Titanate," J. Am. Ceram. Soc., 79(11) 2929–39 1996.

W. Hertl, "Kinetics of Barium Titanate Synthesis," J. Am. Ceram. Soc., 71 (10) 879–83, 1988.

Seungwon Kim et al "Preparation of Barium Titanate by Homogeneous Precipitation," J. Mater. Sci., 31, 3643–48, 1996.

J.C. Niepce et al "About the Mechanism of the Solid–Way Synthesis of Barium Metatitanate. Industrial Consequences," Solid State Ionics, 43, 69–76, 1990.

Elliott B. Slamovich et al Structure Evolution in Hydrothermally Processed $BaTiO_3$ Films, J. Am. Ceram. Soc, 79, 239–47, 1996.

Satoshi Wada et al, "Preparation of Barium Titanate Fine Particles by Hydrothermal Method and their Characterization," J. Ceram. Soc. Jap., Intl. Edition, 103, 1207–13, 1995.

Hong Kyu Park et al, "Effect of Solvent on Titania Particle Formation and Morphology in Thermal Hydrolysis of $TiCl_4$," J. Am. Ceram. Soc., 80 (3) 743–49, 1997.

J. A. Kerchner et al, "Nucleation and Formation Mechanisms of Hydrothermally Derived Bacium Titanate," ACS Symp. Ser., 681, 106–119, 1998.

D. E. Rase et al, "Phase Equilibria in the System $BaO$–$TiO_2$," J. Am. Ceram. Soc., 38, 104–13, 1955.

Primary Examiner—Steven P. Griffin
Assistant Examiner—Cam N. Nguyen
(74) Attorney, Agent, or Firm—Shelley L. Stafford (57) ABSTRACT

The present invention is a low-temperature controlled method for producing high-quality, ultrafine monodispersed nanocrystalline microsphere powders of barium titanate and other pure or composite oxide materials having particles ranging from nanosized to micronsized particles. The method of the subject invention comprises a two-stage process. The first stage produces high quality monodispersed hydrous titania microsphere particles prepared by homogeneous precipitation via dielectric tuning in alcohol-water mixed solutions of inorganic salts. Titanium tetrachloride is used as an inorganic salt precursor material. The second stage converts the pure hydrous titania microsphere particles into crystalline barium titanate microsphere powders via low-temperature, hydrothermal reactions.

6 Claims, 11 Drawing Sheets

U.S. PATENT DOCUMENTS 4,946,810 * 8/1990 Heistand, II et al. ............... 501/137
5,082,812 * 1/1992 Davis et al. ......................... 501/137
5,338,353 * 8/1994 Uchino et al. ....................... 106/426
5,520,900 * 5/1996 Hennings et al. .................... 423/448

* cited by examiner

METHODS FOR PRODUCING MONODISPERSED PARTICLES OF BARIUM TITANATE

This invention was made with Government support under contract DE-AC05-96OR22464 awarded by the Division of Materials Sciences, Office of Basic Energy Sciences, U.S. Department of Energy to Lockheed Martin Energy Research Corporation, the Government has certain rights in this invention.

FIELD OF THE INVENTION

The present invention relates to a method for producing pure monodispersed microsphere powders of barium titanate. The present invention particularly relates to a method using mixed solvent synthesis for producing ultrafine monodispersed microsphere powders of pure materials such as titania and zirconia and further converting these pure materials using low temperature hydrothermal reactions to produce pure nanocrystalline microsphere powders of barium titanate, strontium titanate, lead titanate, zirconium titanate, titanium zirconate, lead zirconate, and others, wherein the powders comprise particles ranging from nanosized particles to micronsized particles.

BACKGROUND OF THE INVENTION

Oxide-based ceramics have many applications as structural or functional materials. Ultrafine, monodispersed oxide powders are important building-block materials for fabrication of advanced ceramics. The characteristics of powders, in terms of size shape/morphology, monodispersity, and microstructure, directly affect the quality of final ceramic products. The molecular homogeneity of the chemical composition in the composite ceramic powders is also a significant factor for controlling the uniformity of final composite ceramics.

Barium titanate ($BaTiO_3$), a perovskite-type electroceramic material, has been extensively studied and utilized due to its dielectric and ferroelectric properties. Two crystalline phases of barium titanate are especially important for applications in the microelectronics industry. The tetragonal phase of barium titanate show ferroelectric, piezoelectric, and thermoelectric properties and is used in a broad array of electronic devices. The cubic form of barium titanate, though not ferroelectric, has a high dielectric constant (1500–1600 at room temperature) making it suitable in capacitors. The wide applications of barium titanates include multilayer capacitors in electronic circuits, electro-optical devices, thermistors, piezoelectric actuators, nonlinear resistors, thermal switches, passive memory storage devices, and transducers. In addition, barium titanate can be used for chemical sensors due to its surface sensitivity to gas adsorption. The overriding goal in barium titanate processing is to create smaller, ultrafine, more uniform particles and powders to allow for finer ceramic layers to be used in multilayer capacitors (and thus, achieve device miniaturization) without the loss of dielectric properties. Controlling the phase, composition homogeneity, particle size and monodispersity, microstructure, and even the cost of particle production are important concerns in developing techniques for synthesizing barium titanate.

Traditionally, barium titanate has been prepared by a solid-state reaction involving barium carbonate and titanium dioxide, typically at temperatures over 900° C. as described by Niepce and Thomas, 1990, followed by grinding and further calcination. The resulting microstructure has not been sufficient for microelectronic applications due to a lack of uniform nanocrystalline barium titanate. The resulting microstructure has a wide grain-size distribution, multiple phases, and is inevitably porous. These characteristics result from inadequate existing ball-milling operations that can introduce such impurities as alumina, silica, sulfur, phosphorus, etc. The lack of control over the physical and/or chemical characteristics of commercial barium titanate particles results in microstructural variations that lead to poor electrical property optimization and reproducibility. Wet chemical techniques for synthesizing ceramics offer exciting ways for preparing ultrafine, homogeneous, high-purity powders at temperatures far below those required for conventional powder preparation.

Various wet chemical synthesis methods in literature for preparing barium titanate powders include homogeneous precipitation (described by Kim et al. 1996), coprecipitation, gas condensation (described by Li et al., 1997) and sol-gel processing (described by Kerchner et al., 1998). However, these techniques are not without some serious shortcomings. For instance, sol-gel processing with metal alkoxides allows for the fabrication of fine particles of barium titanate or other ceramics, but temperatures over 700° C. are required to remove unreacted organics from the crystalline phase.

Wet chemical, hydrothermal processing with inorganic precursors offers an exciting way to prepare ultrafine (submicron), crystalline ceramics by using an aqueous medium under strongly alkaline conditions, as described by Kerchner et al., 1998. Numerous ceramic powders can be conveniently synthesized by the hydrothermal method, which allows for production of phase-pure products under low temperatures ($\leq 100°$ C.) and facile control of reaction conditions such as concentrations, pH, and temperature. In contrast to the expensive sol-gel route with alkoxides, inorganic salts of barium and titanium used by Wada et al. (1995) and Eckert Jr. et al. (1996) are relatively inexpensive. Wada et al (1995) was able to produce barium titanate by adding barium hydroxide to a gel network of hydrous titanium tetrahydroxide, while Eckert Jr. et al (1996) prepared barium titanate from hydrothermal conversion of a commercial titania particles in solutions of barium hydroxide octahydrate. Two possible mechanisms have been generally proposed for the hydrothermal conversion of titania into barium titanate (Kerchner et al, 1998; Eckert Jr. et al., 1996; Hertl, 1988): (1) In-situ transformation, involving $Ba^{2+}$ diffusion through formed $BaTiO_3$ shell layer around the titania particle, then reaction with $TiO_2$ core. The overall conversion rate could be either diffusion-controlled or reaction-rate controlled. Barium titanate particles obtained by this mechanism should maintain their size and morphology similar to those of their precursor titania particles. (2) Dissolution-precipitation, involving $TiO_2$ dissolution into species $Ti(OH)_x^{4-x}$, precipitative $BaTiO_3$ nucleation (heterogeneous or homogeneous in nature) by reaction with Ba ions/complexes in solution, and then recrystallization/growth. Barium titanate particles from this mechanism are usually different from the precursor titania particles in their size and shape. The hydrothermal methods using titania gel or commercial titania particles are effective (kinetics and composition wise) in producing submicron barium titanate, however, synthesis of very uniform (also dispersed) microspheres has not been achieved and thus needs more development.

OBJECTS OF THE INVENTION

Accordingly, it is an object of the present invention to provide an energy efficient, low-cost, low-temperature method for producing high-quality ultrafine monodispersed powders having microspherical particles of a pure material such as titania.

It is another object of the present invention to provide an energy efficient, low-cost method for producing high-quality ultrafine monodispersed powders having nanosized particles of a pure material such as titania.

It yet another object of the present invention to provide an energy-efficient, low-cost method for producing high-quality ultrafine monodispersed powders of barium titanate, having particles ranging from nanosized particles to micron-sized particles.

Further and other objects of the present invention will become apparent from the description contained herein.

SUMMARY

In accordance with one aspect of the present invention, the foregoing and other objects are achieved by a method for producing monodispersed barium titanate microsphere particles comprising the steps of providing an aqueous solution of an inorganic salt precursor material at a pH of less than or equal to 5, the inorganic salt precursor material having an initial concentration in the range from about 0.01 M to about 1.0 M; providing an aqueous solution of a stearic dispersant; then mixing the aqueous solution of the inorganic salt precursor material and the aqueous solution of the stearic dispersant with an alcohol to form a suspension of titania particles, wherein the stearic dispersant is in a sufficient amount and at a sufficient concentration so to contact the titania microsphere particles and adsorb onto the particles to aid in the production of the titania microsphere particles and wherein the volume ratio of the alcohol to aqueous part is in the range of 2 to 4; and then incubating in an oven the suspension at a temperature in the range from about 25° C. to about 100° C. for a sufficient time period so to allow for the formation and precipitation of uniform, monodispersed titania microspheres wherein the microspheres having a particular size determined by the initial concentration of the inorganic salt precursor material, the volume ratio of alcohol to aqueous part, the incubation temperature and the incubation time; then cooling the suspension to room temperature; then neutralizing the suspension to chemically stabilize the titania microsphere particles; then washing the titania microsphere particles with water to rid the suspension of impurities; then adding a predetermined amount of barium hydroxide octahydrate to the suspension of titania microsphere particles to begin a process of consuming the barium by a barium titanate-forming reaction, the barium hydroxide octahydrate in an amount predetermined to give an initial barium/titanium ratio of 1, and wherein the suspension having a pH value after the addition of the barium hydroxide octahydrate is in the range from about 10 to about 12; and finally incubating in an oven the suspension of titania microsphere particles at a temperature of less than or equal to 100° C. for a sufficient time period so to hydrothermally convert the titania microsphere particles to nanocrystalline barium titanate microsphere particles.

BRIEF DESCRIPTION OF THE DRAWINGS

For a better understanding of the present invention, together with other and further objects, advantages and capabilities thereof, reference is made to the following disclosure and appended claims when read in connection with the appended drawings, wherein:

DETAILED DESCRIPTION OF THE INVENTION

The present invention is a low-temperature method for producing high-quality, ultrafine monodispersed nanocrystalline powders of barium titanate and other pure or composite oxide materials having particles ranging from nanosized to micronsized particles. The method of the present invention comprises a two-stage process. The first stage produces high quality hydrous titania or zirconia particles prepared by homogeneous precipitation via dielectric tuning in alcohol-water mixed solutions of inorganic salts. Inorganic compounds such as $ZrOCl_2$, titanium tetrachloride and barium hydroxide are used as precursor materials. The second stage converts the titania or zirconia particles into composite oxide materials such as barium titanate particles via low-temperature hydrothermal reactions. The size and morphology of titania or zirconia particles were controlled using isopropanol to fine-tune the dielectric constant of the isopropanol-water mixed solvent system. Monodispersed particles approximately 0.1–1 μm in diameter were successfully synthesized for the further conversion into nanocrystalline barium titanate particles or other composite material.

Barium titanate and titania particles were characterized by scanning electron microscope (SEM) and room temperature X-ray diffraction (RTXRD). High temperature X-ray diffraction (HTXRD) was also utilized for in-situ study of the phase transformations and changes of crystallite size with calcination temperatures. The titania particles were predominately in the anatase (and some brookite) phase at room temperature and were converted to the rutile phase when the calcination temperature was increased from 650° C. to 900°

C. Monodispersed nanocrystalline barium titanate particles were successfully synthesized from optimized titania via a hydrothermal reaction ($\leq 100°$ C.) in barium hydroxide solutions. The size and morphology of the barium titanate particles remain the same as the precursor titania microsphere particles, indicating a "shrinking-core" diffusion-reaction mechanism. Barium carbonate in the form of witherite was also found along with the formation of barium titanate, especially under conditions with higher Barni ratios, but a formic acid washing procedure effectively removed this impurity phase from the barium titanate samples. The as-prepared barium titanate was in the cubic nanocrystalline form and did not change when the temperature was increased from room temperature to as high as 750° C. The cubic phase was also stable at high temperatures for over five hours.

EXAMPLE 1

Preparation of Starting Solutions

Titanium tetrachloride liquid (99.6% $TiCl_4$ Alfa Aesar, Ward Hill, Mass.) (5.55 mL) was slowly added to icecold aqueous HCl solution (2.85 mL 1.0 N HCl in ~20 mL distilled water), which was constantly stirred in a 50 mL volumetric flask. The acidity is needed to minimize the explosive generation of orthotitanic acid ($Ti(OH)_4$) and thus the uncontrolled precipitation during the dissolution $TiCl_4$ in the aqueous solution. The final concentration of titanium in the prepared $TiCl_4$ stock solution was 1.0 M. The solution became somewhat turbid during the dissolution step but gradually cleared up within approximately 30 minutes, while the temperature of the solution rose to room temperature (~23° C.). This stock was freshly prepared for each set of experiments and kept overnight before use. The stearic dispersant, hydroxypropylcellulose (HPC), was used as a steric dispersing agent that adsorb on the surfaces of particles in a suspension to aid in the production of monodispersed microspheres. HPC (average molecular weight ~100,000 g/mol) was added to icecold distilled deionized water to make a stock solution with a concentration of 0.1 $g/cm^3$.

Synthesis of Titania Microspheres

Once the inorganic salt was dissolved in water as mentioned above and as described by Park et al. (*J. Am. Ceram. Soc.*, 80 (3), 1997) incorporated herein by reference, then mixed with isopropanol. Isopropanol was chosen to the most favorable alcohol system to reduce the dielectric constant of particle-forming medium The volume ratio of alcohol to aqueous part (RH), initial concentration of titanium salt ($TiCl_4$), incubation time, and incubation temperature were controlled to allow for the rapid formation of uniform well-dispersed microspheres of hydrous titania of a particular size, which were then used as a good-quality precursor for the formation of nanocrystalline barium titanate particles. It was found that a narrow RH ratio (i.e., an alcohol/aqueous volumetric ratio of 2 to 4) was required for optimal nucleation and growth of monodispersed titania particles. A 30-mL volume of the mixture containing $TiCl_4$, HPC, water, and isopropanol was routinely kept in a 40-mL capped glass vial that was incubated in an oven. Unless otherwise indicated, the conditions for titania microsphere synthesis in this EXAMPLE of the present invention were: 0.2 M $TiCl_4$, RH ratio of 2, 0.002 $g/cm^3$ HPC, and incubation at 100° C. for 24 hours in an oven. (Although the precipitation may have completed in a few hours, longer incubation ensured that the $TiO_2$ microspheres were completely aged.) The white microsphere particles settled to the bottom of the glass vial after incubation and were resuspended easily by shaking the vial manually. The glass vial containing the particle suspension was cooled down to room temperature by immersion in tap water in a container. Immediately after cooling, the suspension was neutralized by titration using 5 N $NH_4OH$ with constant stirring to chemically stabilize the microspheres. Without neutralization, the microspheres could redissolve with the addition of water during a later-stage washing step. Centrifugation and resuspension with deionized water (30 mL) were routinely repeated twice to rid the suspension of any impurities, such as chloride or ammonia, that might interfere with the X-ray diffraction (XRD) spectrum. The resulting washed titania suspension (containing 0.2 mol titanium equivalent) was kept in deionized water for hydrothermal conversion and synthesis of barium titanate.

Hydrothermal Synthesis of Barium Titanate Microsphere Particles

A predetermined amount of barium hydroxide octahydrate crystals (98% $Ba(OH)_2 \cdot 8H_2O$, Baker Analyzed, Phillipsburg, N.J.) (e.g., 1.89 g for an initial Ba/Ti molar ratio of 1) was added to a 30 mL titania suspension in deionized water (0.2 M Ti equivalent, unless otherwise indicated). In the beginning of the conversion process, complete dissolution of barium hydroxide in water was not achieved at room temperature or even when water was heated to 100° C. due to the solubility limitation; however, the incomplete dissolution did not affect the barium titanate formation. Consumption of $Ba^{2+}$ by the $BaTiO_3$-forming reaction could have aided in further dissolution of undissolved solid $Ba(OH)_2$ crystals. The pH of the suspension after addition of the barium hydroxide was measured between 10 and 12 (depending on the concentration of barium hydroxide), which is sufficiently high for the formation of barium titanate. Potassium hydroxide (KOH, Fisher Chemicals) was also used to increase the pH level. After the hydrothermal conversion of 0.2 M (titanium equivalent) titania microspheres (Ba/Ti=1) at 100° C. for 24 hours (unless otherwise indicated), the suspension settled to the bottom and a sample was taken for analysis by SEM or XRD. In some cases, the particles were washed twice with 30 mL deionized water before analysis.

To reduce the barium carbonate impurity level in the barium titanate suspension, immediately after the hydrothermal conversion (incubation) and while the suspension was still hot, 10 mL formic acid was added to a 30 mL volume of $BaTiO_3$ suspension (0.2 M Titanium equivalent, and initial Ba/Ti molar ratio of 1). The suspension was allowed to sit for 15 minutes at room temperature; then it was centrifuged and washed with deionized water, centrifuged again, and most of the water was removed by pipette. The remaining white paste was air dried to form powder for analyses.

Characterization of the Ultrafine Particles

The particle size and morphology of the resulting product were analyzed by a scanning electron microscope (SEM, JSM-T220A, JEOL). Thick suspensions of titania particles or barium titanate particles were spread on a carbon conductive tape attached to the surface of an SEM brass stub. Particles on the brass stub were then coated with palladium-gold by plasma sputtering (Hammer 6.2 Sputtering System, Anatech Ltd.) for ~3 minutes to create a conductive surface layer that is necessary for SEM imaging. Room temperature X-ray diffraction (RTXRD) (Scintag PAD V using Cu K$\alpha$ radiation) was used for phase identification of the particle samples and determination of crystal size. Data from differential thermal analysis (DTA, millivolts vs. temperature (° C.)) and thermal gravimetric analysis (TGA, milligrams vs. temperature (° C.)) (Harrop Model ST-736) helped to reveal the temperature ranges of phase transformation (or crystal rearrangements) that would assist in the design of an automated program for high temperature X-ray diffraction (HTXRD)(Scintag PAD X using Cu Kα radiation). The HTXRD instrument was used to determine crystal composition at various temperatures from room temperature to above 1000° C.

Titania particles were prepared under various conditions by changing the $TiCl_4$ concentration, RH ratio, time of incubation, and temperature of incubation. SEM was utilized to reveal the microspherical morphology and size of particle samples obtained. As the concentration increased, particle size increased from submicrometer to slightly greater than one micrometer. Particles obtained from the lowest concentration, 0.05 M, were somewhat soft, less spherical, and contained relatively rough and "sticky" particle surfaces. These particles tended to aggregate into clusters in solution and also to stick together during drying to form a gelly-like microstructure. However, less aggregation between titania microspheres and a better defined microspherical shape (solid sphere with smooth surface) resulted from higher concentrations, such as 0.10 $TiCl_4$. Still, some dimers (i.e., union of two microspheres) or even trimers were observed. The highest concentration (at 0.20 M) yielded monodispersed particles having perfect, solid microspherical morphology. These titania microspheres were fully dispersed in solution as well as after they were dried to form powders.

The effects of incubation time was seen by examining precipitates obtained by using two different incubation times, 24 hours and 1 hour, while other process parameters remained the same (i.e., 0.1 M $TiCl_4$, RH=2, HPC=0.002 $g/cm_3$, 100° C.). The shorter incubation time of 1 hour resulted in particles with less spherical shape, lower concentration of titania particles, more particle aggregation, plus some residual materials, most probably from unreacted chemicals. Temperature, on the other hand, had the most significant effect on the reaction kinetics and the state of the particles. Titania particles that resulted from incubation at 100° C. were uniform ~1.0 μm microspheres, while incubation at 90° C. produced "unmature" spherical particles containing some residual precursor chemicals. In summary, the reaction conditions of 0.2 M $TiCl_4$, RH ratio of 2, 0.002 $g/cm^3$ HPC, incubated at 100° C. for 24 hours, yielded the best morphology and size for titania particles.

Figure 1:
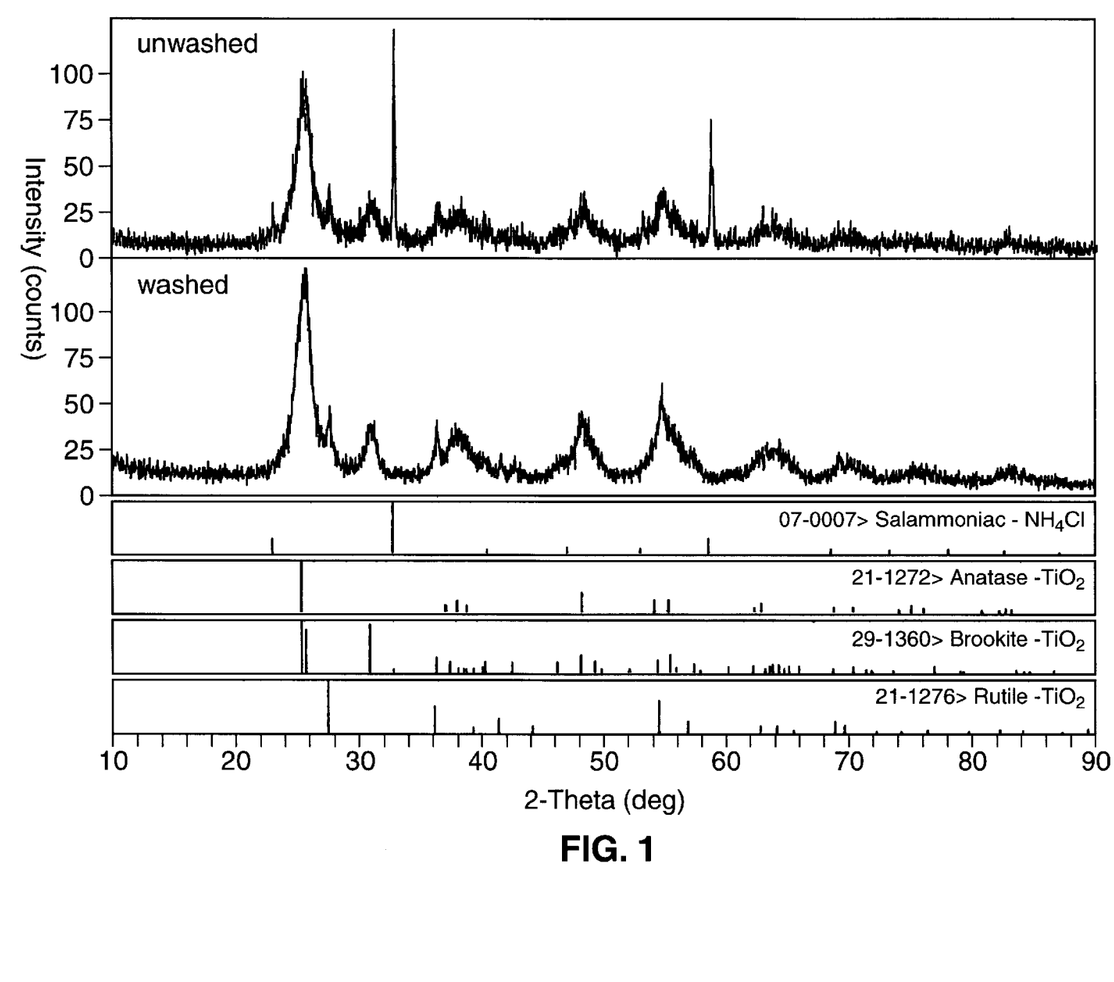
FIG. 1 shows an RTXRD spectrum of an unwashed $TiO_2$ sample and spectrum of a washed $TiO_2$ sample having no interfering peaks except for the $BaCO_3$ witherite peaks. The PDF cards (from top to bottom) corresponds to the one for Salammoniac, Anatase, Brookite, and Rutile, respectively.

The crystalline structure of the titania microspheres was determined using RTXRD. The advantage of using a washing procedure on the purity of titania microspheres can be observed by comparing the spectrum for the unwashed $TiO_2$ sample and the one for the washed $TiO_2$ sample FIG. 1. After the titania particles were formed, some residual chloride ions ($Cl^-$) were present in the titania suspension from the titanium chloride precursor as well as some ammonia ions ($NH_4^+$) from the neutralization step. The specific source of the impurity (corresponding to the two sharp peaks present at approximately 2θ=32.5° and 58.2° in FIG. 1) was confirmed to be salammoniac ($NH_4Cl$ cubic phase); however, the washing procedure was effective in removing these impurities from the titania microspheres. The pattern of the X-ray diffraction (FIG. 1) shows that as-prepared titania at room temperature consists primarily of anatase (broad peaks), some brookite (broad peaks), and trace amounts of rutile (sharp peaks). Due to superpositioning of the major anatase (2θ=25.281° from PDF# 21-1272) and brookite (2θ=25.3390 from PDF# 29-1360) diffraction peaks. It is difficult to distinguish between these two polymorphs of $TiO_2$. This is especially true when the diffraction peaks are broad. The anatase polymorph can best be identified by the absence of diffraction peak at 2θ=30.807° that would correspond to the $I/I_{100}$=90% of brookite.

Figure 2:
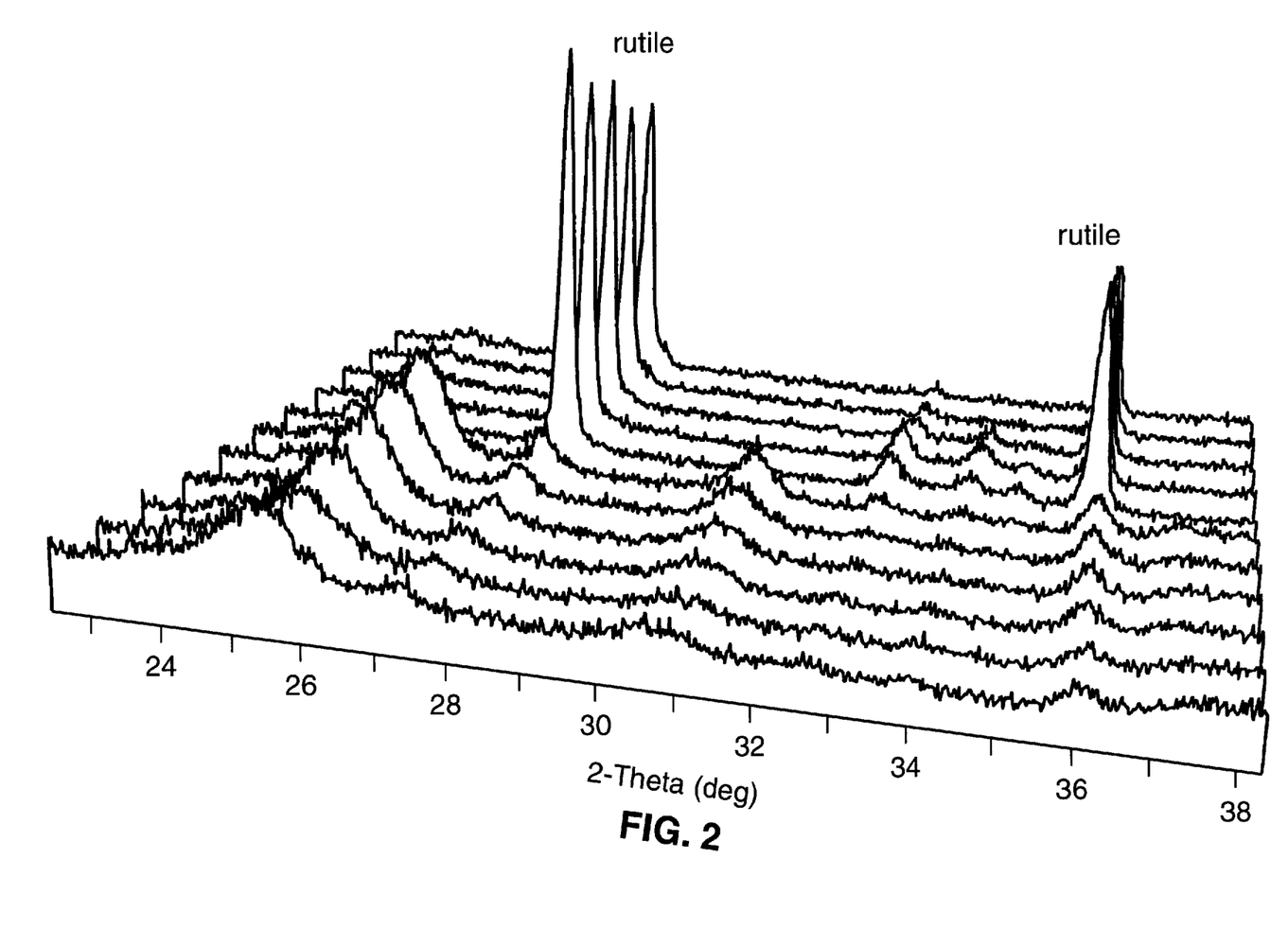
FIG. 2 shows an HTXRD spectra showing the phase transformation of $TiO_2$ microspheres from anatase (brookite) to rutile with increasing calcination temperature.
Figure 3:
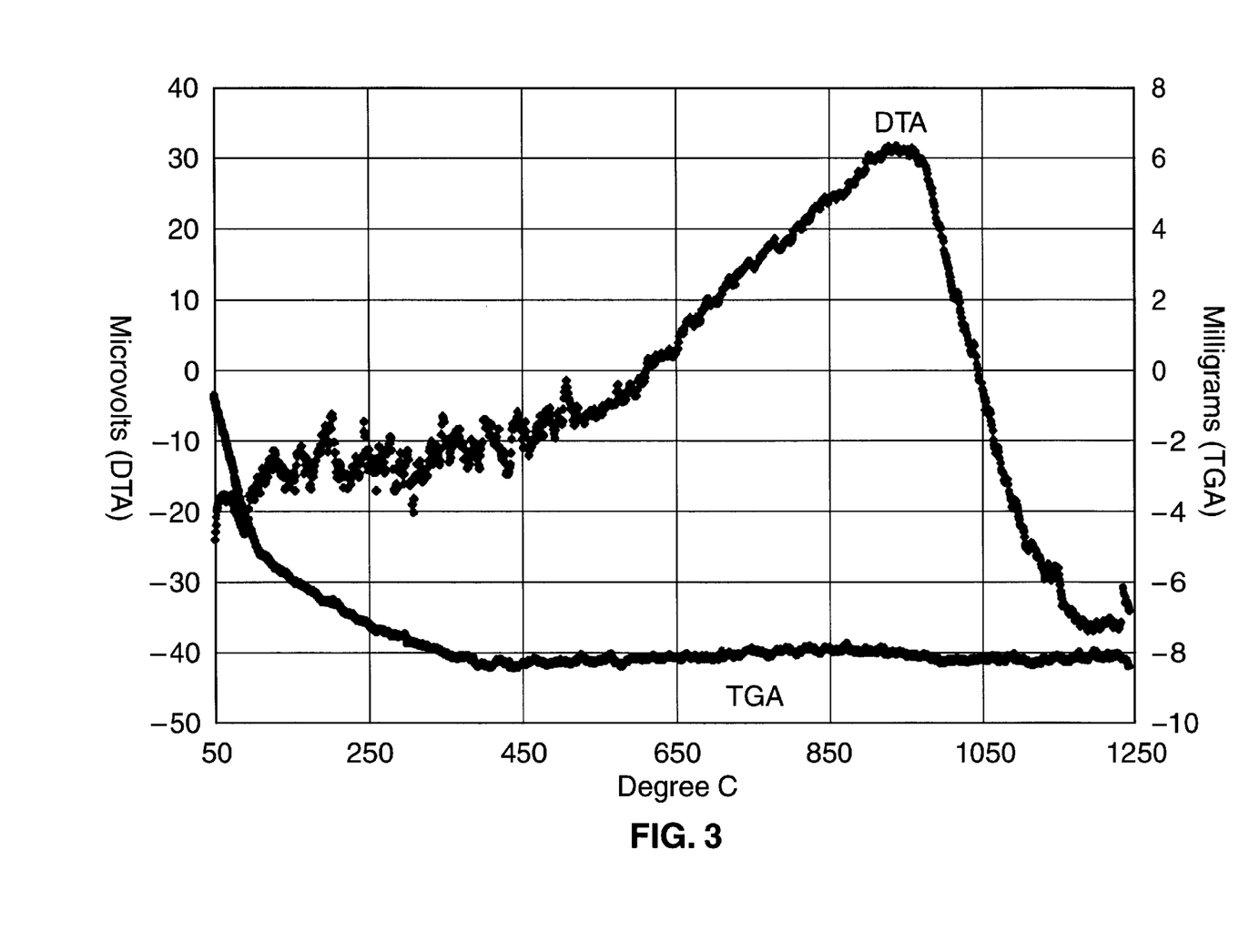
FIG. 3 shows a DTA/TGA of a titania sample (with Ba/Ti=½) in 20% $O_2$ and 80% $N_2$ at 5° C./min.

The HTXRD for the titania microspheres shows that the phase composition changed markedly after the sample had been heated (FIG. 2). It is clear that anatase was the major phase at 27° C. As the calcination temperature was increased to 650° C., the brookite phase increased as seen by the larger Bragg peak at 2θ=30.807° and the rutile phase ($I/I_{100}$=100% at 2θ=27.4460, PDF# 21-1276) increased slightly (FIG. 2). Between 650° C. and 900° C., there was a marked transformation to only the rutile phase, although the TGA/DTA data in FIG. 3 indicate that a phase transition would occur at a lower temperature, ~550° C. Rutile was the predominant phase up to the highest tested temperature, 1150° C. It has been shown in phase diagrams of two titania systems, in the literature that at atmospheric pressure (1.013 bars), an increase in temperature converts the anatase form to rutile at approximately 600° C., while a sample of brookite will remain unchanged up to approximately 700° C., thus supporting the HTXRD data for the present titania sample.

The successful synthesis of barium titanate was achieved by using low-temperature (≦100° C.) hydrothermal conversion of titania. Unlike previous reseachers who have either used commercial titania particles (in the gel-like anatase phase) or titanium gels (in some cases, self-prepared), titania microspheres of the present invention were prepared having well-controlled characteristics in terms of size, morphology, and monodispersity. It is expected that high-quality precursor titania particles will yield good-quality nanocrystalline barium titanate microspheres. The hydrothermal conversion to barium titanate was initiated by the addition of appropriate quantity of barium hydroxide octahydrate ($Ba(OH)_2·8H_2O$) in titania-water suspensions, followed by heating in an oven. Barium hydroxide has a theoretical solubility in water of 5.6 $g/100$ $cm^3$ (at 15° C.) and 94.7 $g/100$ $cm^3$ (at 100° C.). However, in the present invention, barium hydroxide at a concentration of 0.1$g/100cm^3$ of water did not dissolve completely either at room temperature or after heating to near the boiling temperature.

Although the complete dissolution of $Ba(OH)_2$ was not possible, a good progression of reactions between the titania particles and the barium hydroxide in water was evidenced by the formation of barium titanate (its presence was verified by RTXRD). One sample with an initial Ba/Ti ratio of ½ after hydrothermal conversion at 100° C. for 72 hours produced particles consisting of near-monodispersed microspheres of barium titanate. The size and morphology of the converted sample remained almost the same as those of the precursor titania particles, indicating that the formation of barium titanate is possible through the in situ transformation (diffusion-reaction) mechanism. This is somewhat similar to the solid-state reaction process between $BaCO_{3(S)}$ and $TiO_2$ $(S)$, which is generally believed to proceed by the diffusion of the more mobile $Ba^{2+}$ and $O^{2-}$ ions at their contact points with $TiO_2$ particles and into the $TiO_2$ lattice, within which the titanium and oxygen ionic species are believed to be relatively immobile. On the basis of this model, it would be expected that the morphology and size of the product $BaTiO_3$ particles should closely approximate those of the reactant $TiO_2$ particles.

Figure 4:
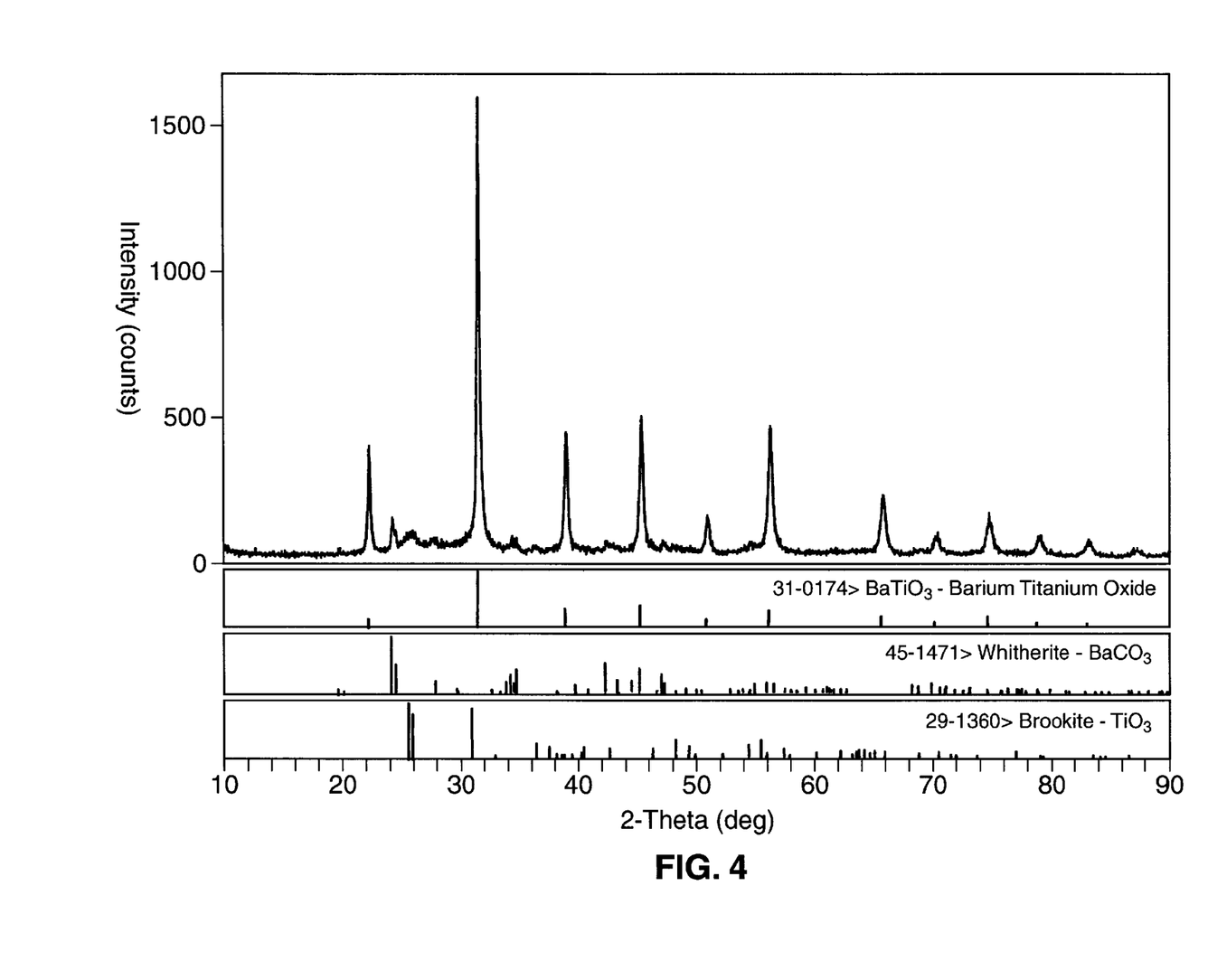
FIG. 4 is an RTXRD spectrum of a barium titanate sample obtained from initial Ba/Ti molar ratio of ½. PDF cards (from the top to the bottom) corresponds to barium titanate, witherite, and brookite.

The RTXRD data (FIG. 4) of the same sample verified the presence of barium titanate phase in the sample. The compound closely matched two X-ray patterns (i.e., PDF# 31-0174 and 74-1468); 31-0174 was used due to sample purity corresponding to barium titanate in the cubic (primitive) form with a Pm3m space group. However, there was a minor unwanted impurity peak at 2θ=~24°, which was found out to be barium carbonate in the witherite form, which is stable at room temperature (FIG. 4). Other barium and carbonate phases interfering with the complete conversion of barium titanate have also been previously reported. In addition, the RTXRD analysis did detect some residual titania phases (anatase or brookite) in the converted sample. This is because there is not enough of barium to react with the surplus titania.

Figure 5:
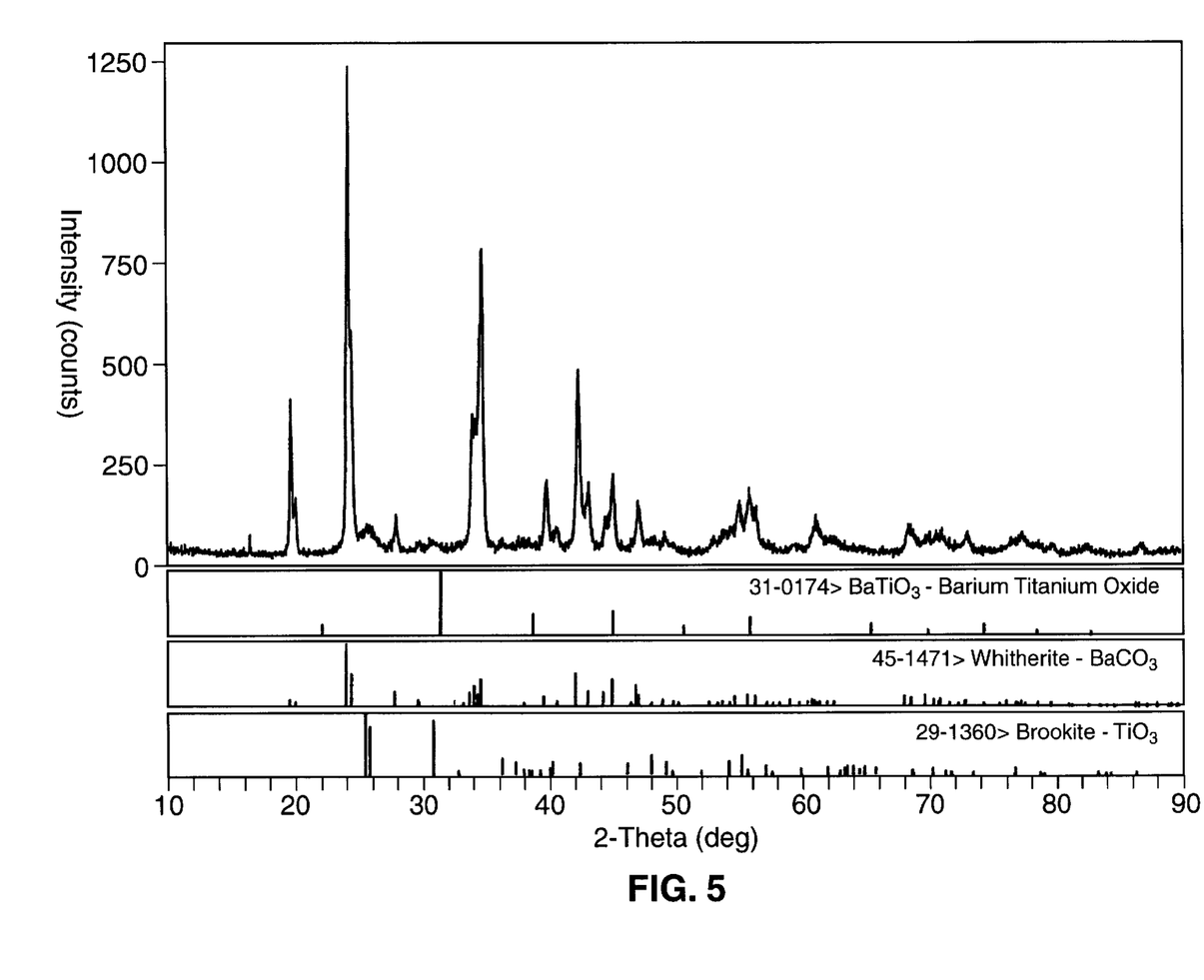
FIG. 5 is an RTXRD of a sample from room-temperature conversion, showing that $BaCO_3$ witherite phase forms at room temperature but $BaTiO_3$-forming reactions require higher temperatures (such as 100° C.) to initiate.

FIG. 5 shows that at room temperature, titania and barium hydroxide did not react to form barium titanate. However, barium carbonate in the wetherite form was formed after room-temperature conversion of the titania suspension (0.2 M titanium equivalent) using barium hydroxide (Ba/Ti=1) for 72 hours, and some titania (mostly anatase) phases were still present. This result indicates that $BaTiO_3$-forming reaction does not occur at room temperature. The diffraction pattern shown in FIG. 5 remained the same even for sample collected after 10-day conversion, indicating that barium carbonate and anatase are stable phases at room temperature. It is also clear that the conversion of titania to barium titanate requires elevated temperatures. So far, the lowest temperature that has been demonstrated for barium titanate formation was reported to be 70° C.

Figure 6:
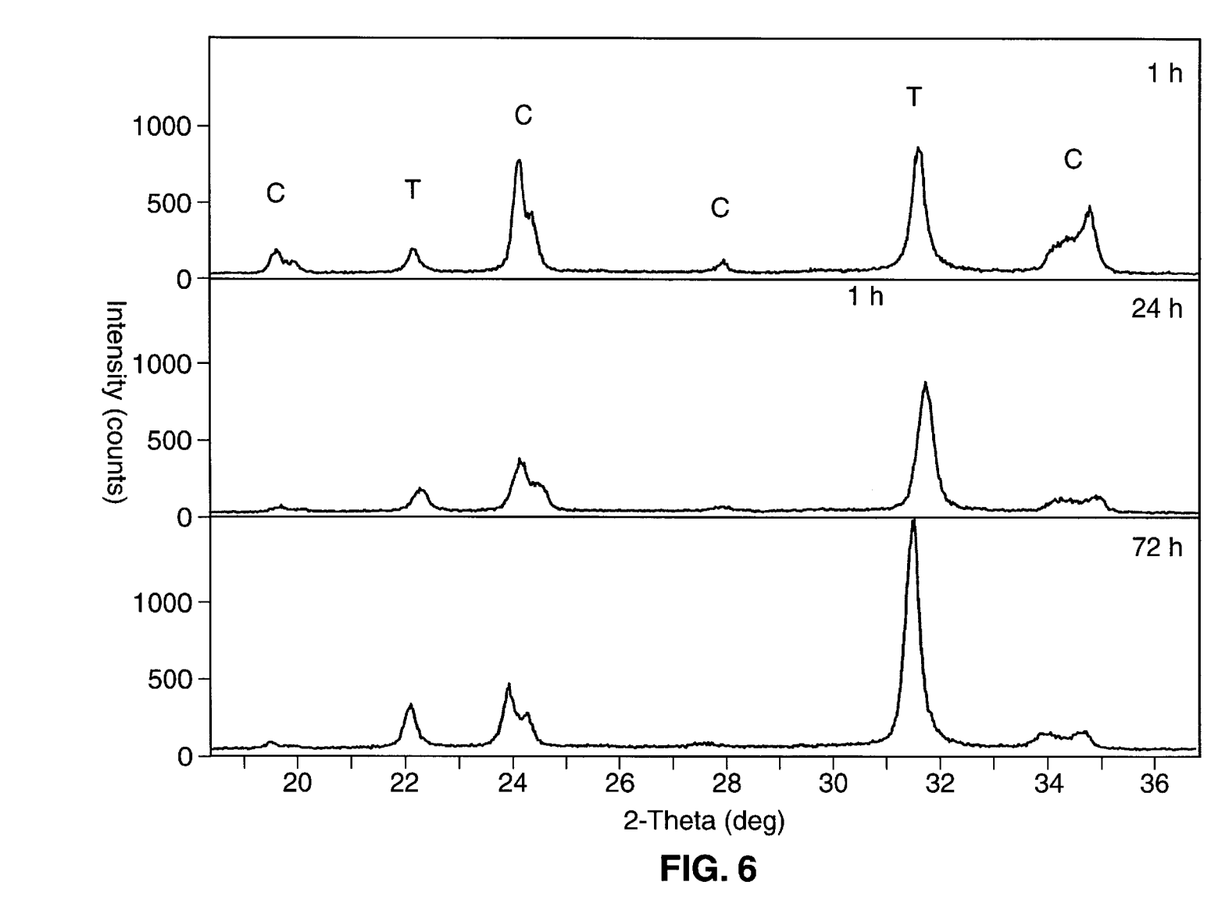
FIG. 6 shows the effect of conversion time on the $BaTiO_3$ formation (at Ba/Ti=1), indicating that longer times favored $BaTiO_3$ conversion.
Figure 7:
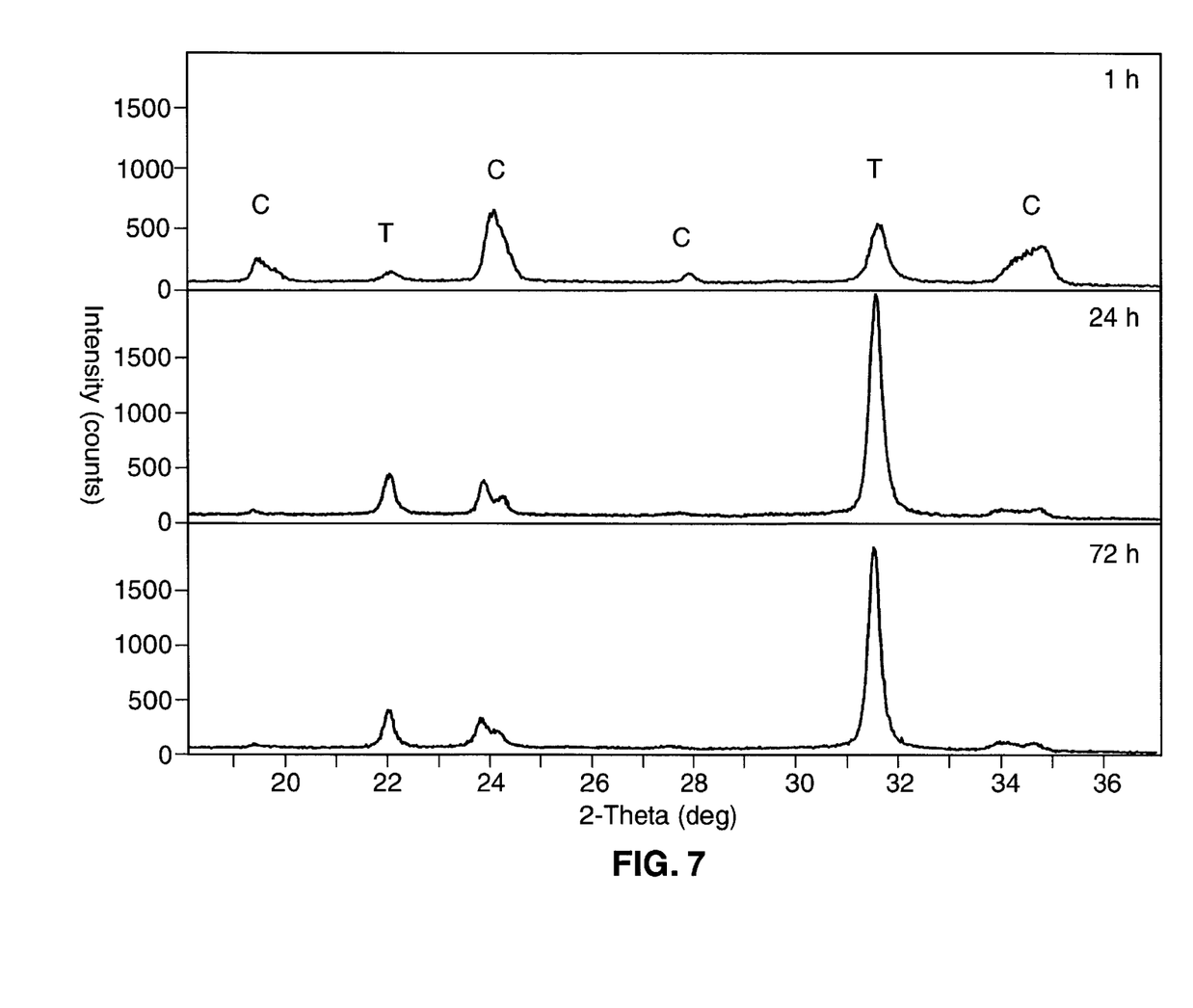
FIG. 7 shows the effect of conversion time on $BaTiO_3$ formation (at Ba/Ti=2).

At 100° C., the specific hydrothermal synthesis of barium titanate in relation to barium carbonate can easily be seen over a period of 1 hour to 72 hours (FIG. 6 and FIG. 7). As indicated, the $BaTiO_3$ crystalline phase formed in 1 hour and longer conversion times favored the further crystallization. A larger quantity of barium ions in the beginning solution would result in a higher proportion of barium carbonate in the early-hour samples. The barium titanate peaks at 2v=22° can be compared with the witherite peak at 2q=24° to observe the synthesis of barium titanate for the sample with Ba/Ti molar ratios of 1 and 2, respectively (FIG. 6 and FIG. 7). The peak intensity ratio of barium titanate over witherite is higher at the 72 hour conversion time that at the 1 hour for both Ba/Ti=1 and Ba/Ti=2, but a quantitative analysis cannot be assessed since the carbonate may arise from carbon dioxide present in the sealed vial. Variations in the time between incubation and analysis during which the sample is exposed to the air at room temperature could produce different levels of barium carbonate for each sample. The sample incubated at room temperature shows that barium carbonate may form immediately with the addition of barium hydroxide to titania, but it is not clear whether most of the barium carbonate is produced during the heating or whether all of it is produced after the vial has been opened to the atmosphere. A RTXRD test verified that the $BaCO_3$ was not an impurity in the commercial $Ba(OH)_2$. The higher $BaTiO_3/BaCO_3$ ratios after a 72 hour conversion period shown in FIG. 6 and FIG. 7 was probably due to the additional formation of $BaTiO_3$ phase rather than to any decrease in $BaCO_3$ levels at 100° C.

Figure 8:
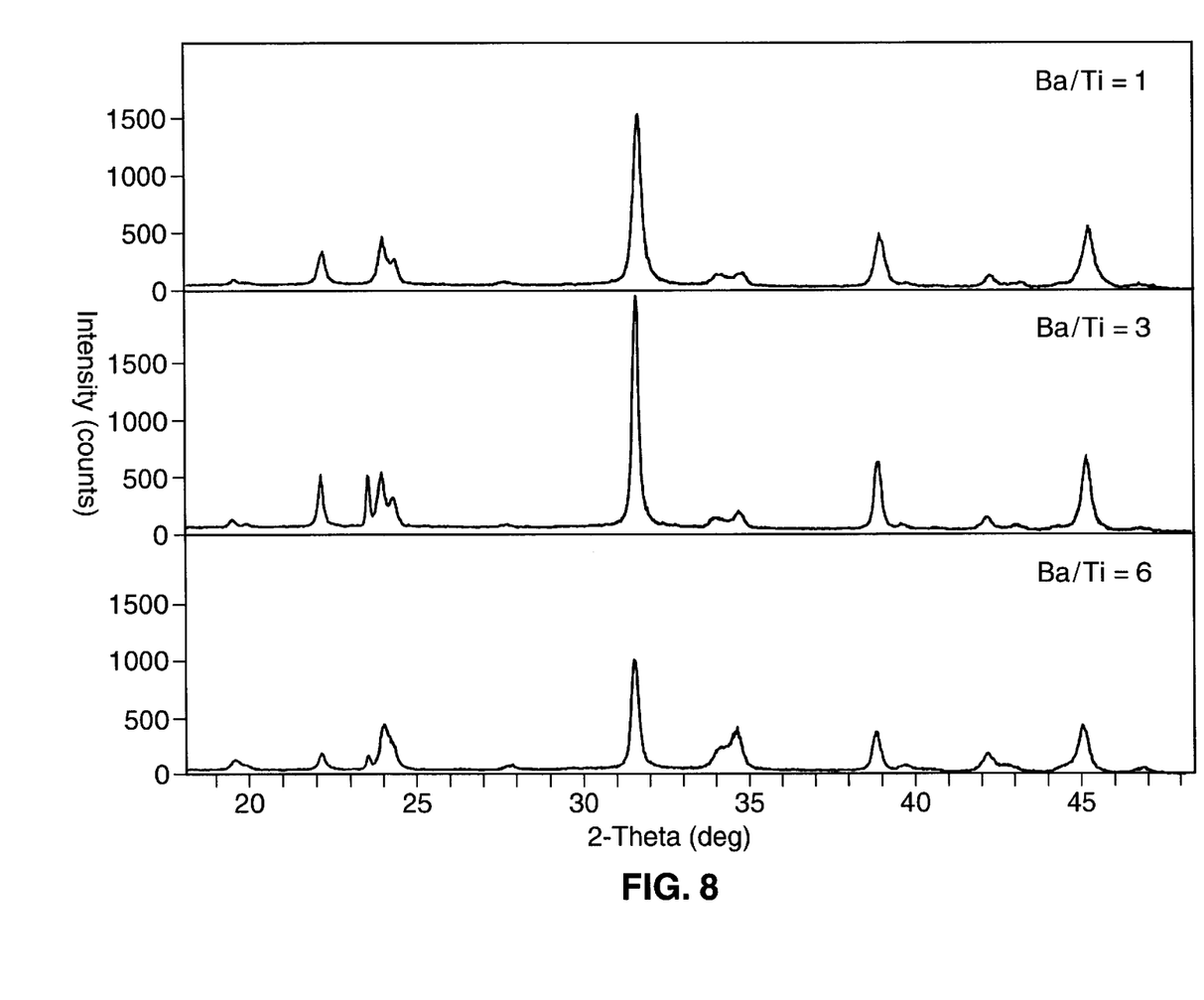
FIG. 8 shows the effect of Ba/Ti molar ratio on the final phase of $BaTiO_3$ samples, showing that Ba/Ti ratio higher than 1 did not help but led to the formation of more witherite impurity.
Figure 9:
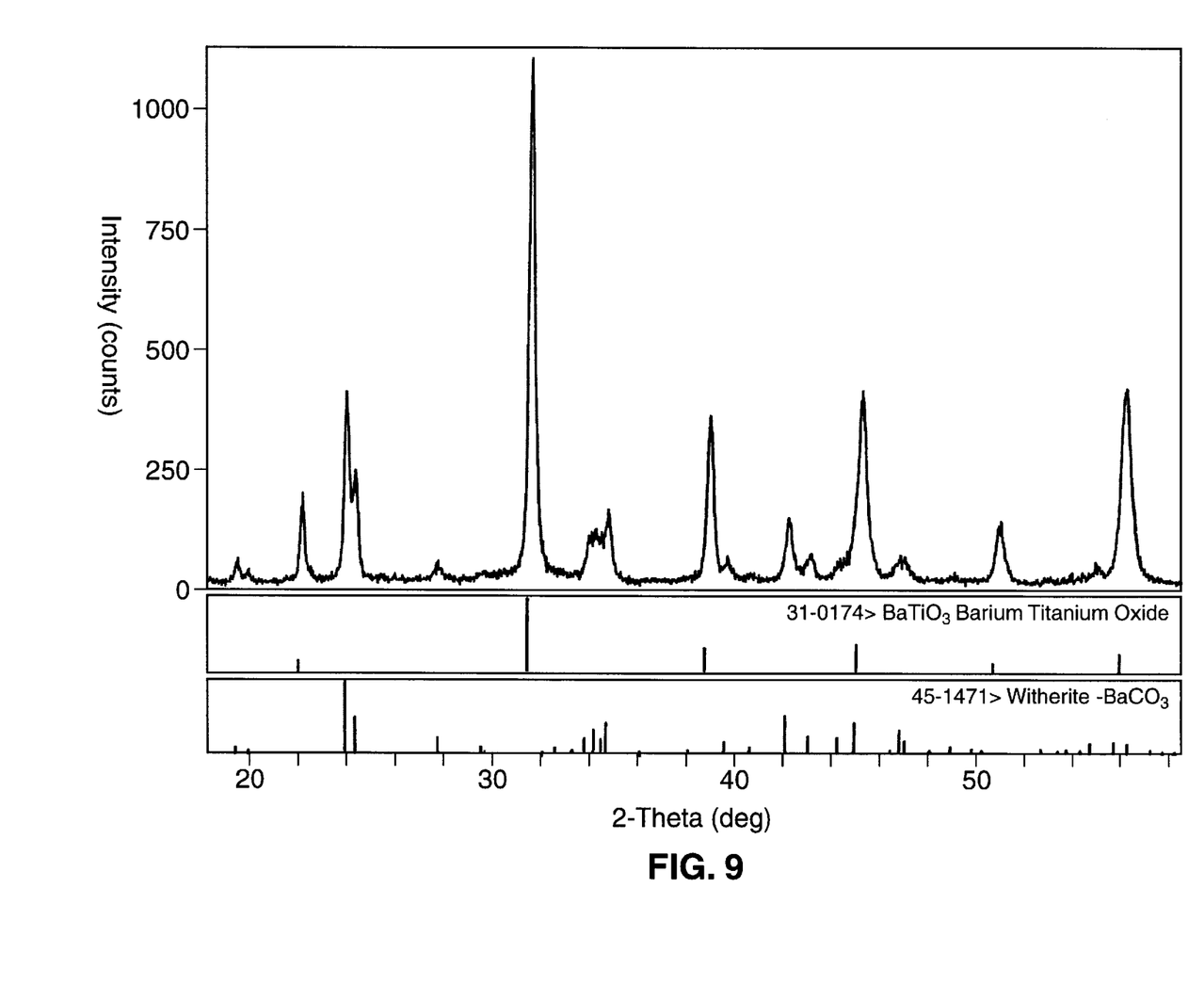
FIG. 9 shows the influence of alkalinity (KOH addition) on the titania to barium titanate conversion.

At a fixed temperature and time for conversion (i.e., 100° C., 72 hours), a higher Ba/Ti molar ratio tended to give higher $BaCO_3$ (witherite) peaks (FIG. 8) but not higher $BaTiO_3$ peaks. A 1 M KOH solution was added to the $TiO_2$—$Ba(OH)_2$ suspension to determine whether a higher pH (13 as opposed to 10 for the typical suspension conversion condition) would change the reaction or characteristics of the final product. There was, however, no significant difference in the diffraction scan (FIG. 9) as compared with the 72 hour scan from FIG. 7, which is for sample made under similar conditions except no addition of KOH.

Figure 10:
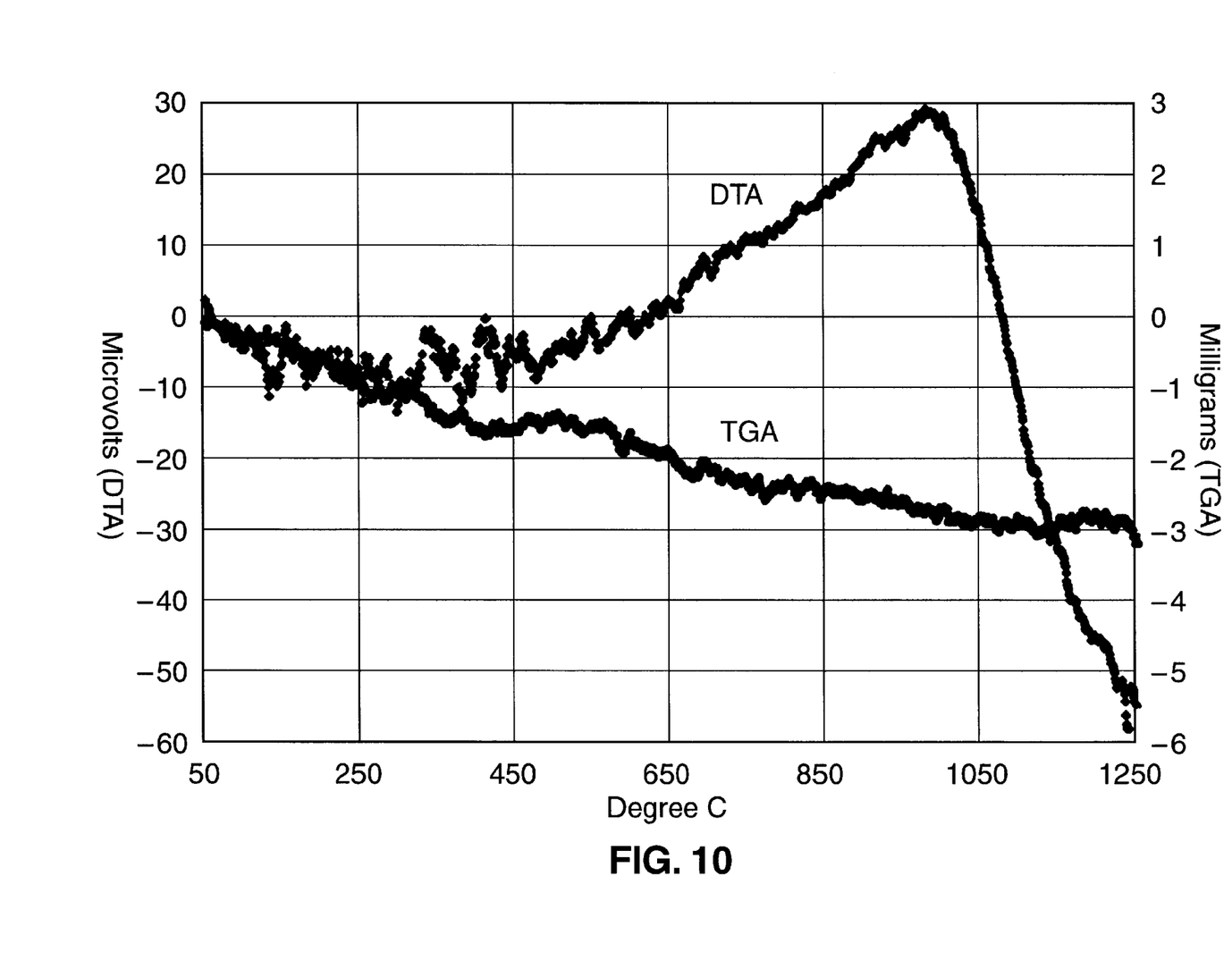
FIG. 10 shows a DTA/TGA of a barium titanate sample (with Ba/Ti=½) in 20% $O_2$ and 80% $N_2$ at 5° C./min.

The TGA/DTA data (FIG. 10) indicated that the barium titanate sample (with initial Ba/Ti molar ratio of ½ and 72 hour conversion period) changed phases at a temperature similar to that observed for titania, approximately 500–600° C. Per the HTXRD data obtained, this barium titanate sample changed in phase between 650° C. and 900° C. (data not shown). The major $BaTiO_3$ peak intensity decreased unexpectedly at temperature above 650° C. This observation disagrees with the supposition that barium titanate would become more crystalline with increasing calcination temperature, usually indicated by an increase in intensity and possibly a sharpening of the peak. Furthermore, the sample melted above 900° C., which was also unexpected because a BaO—$TiO_2$ phase diagram in the literature shows that between 65% and 75% moles of $TiO_2$ (assuming over a 66% ratio of $TiO_2$ due to the barium carbonate phase), cubic barium titanate does not become liquid until at least 1317° C. (Rase and Roy, 1955, incorporated herein by reference). On the other hand, if the $TiO_2$ ratio should increase greater than 80%, the phase diagram indicates that there would be a liquid phase present at temperatures above 1200° C. It is possible that a liquid phase at even lower temperatures, but unfortunately no phase diagram for the system are found in the literature for temperatures below 1200° C.

When a barium titanate sample (from an initial Ba/Ti molar ratio of 1) was subjected to increasing calcination temperatures, the major barium titanate peaks, as well as the other barium titanate peaks between 2θ=~28° and 2θ=~48°, did not change in intensity up to 750° C. (data not shown). The stability of this sample is indicated by the BaO—$TiO_2$ phase diagram obtained by Rase and Roy earlier (1955), which shows that between 35% and 75% (mole) $TiO_2$ the cubic phase of barium titanate is present and no liquid form is present at temperatures well above 1300° C.

To evaluate the stability of the barium titanate at high temperatures, the sample from the Ba/Ti=1 condition was also heated to 300, 600 and 750° C. in HTXRD chamber for longer-time phase stability tests. The first three XRD scans were taken immediately after each other and then three more scans were taken 1 hour after each other. Since each scan required approximately 20 minutes, the total calcination time at each of the three temperatures was over 4 hours. The barium titanate peaks were not altered at these three temperatures, demonstrating the thermal stability of the sample.

Figure 11:
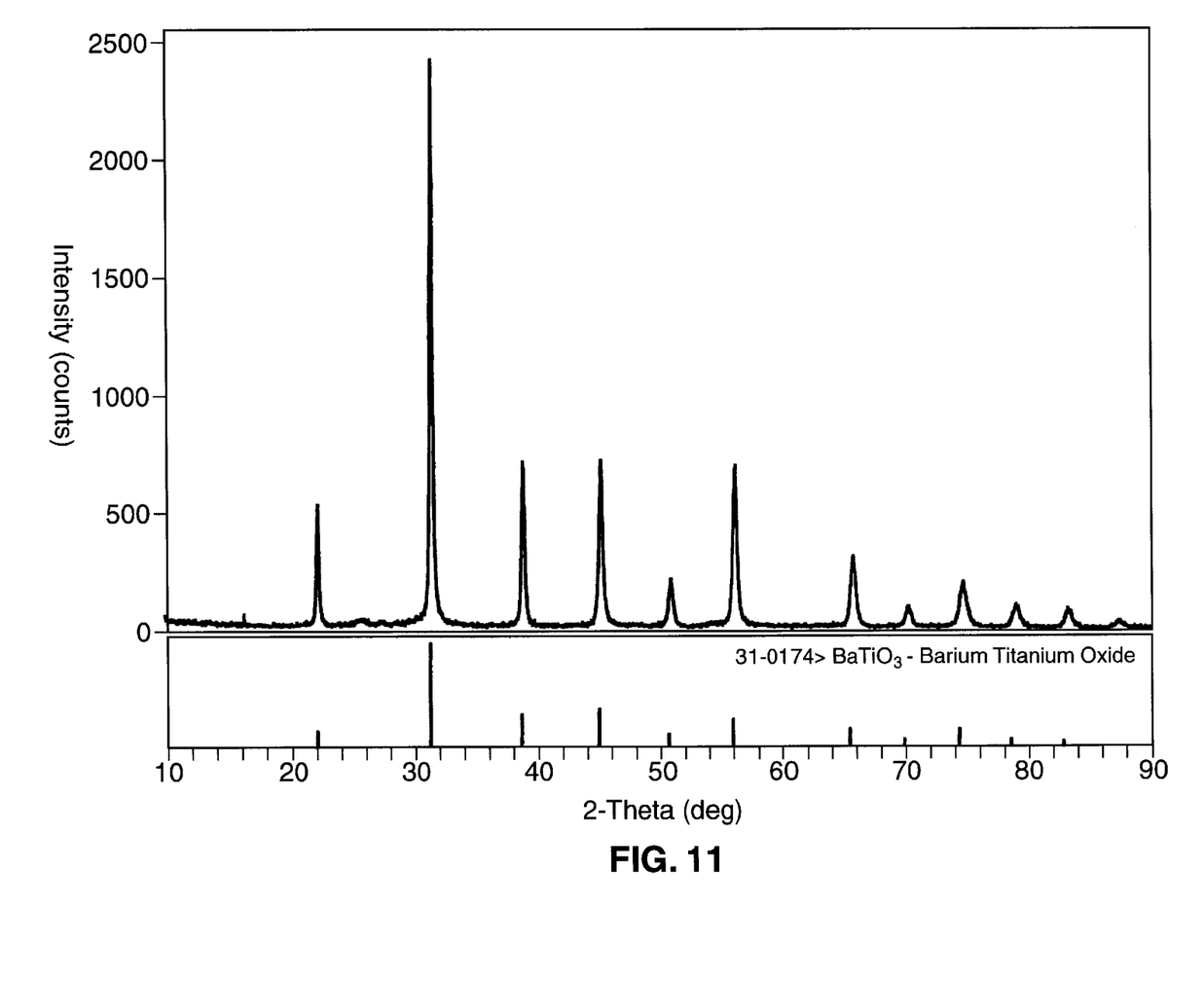
FIG. 11 is an RTXRD spectrum for the barium titanate sample treated with formic acid, indicating high purity of the $BaTiO_3$ phase due to effective removal of the $BaCO_3$ witherite minor phase.

In order to obtain high-purity barium titanate, the conversion reaction were usually conducted in argon atmosphere or use $CO_2$-free water. Alternatively, the sample may be washed with formic acid. In the present invention, formic acid was used in the final step in refining the technique of the present invention for the removal of the barium carbonate phases. With the formic acid treatment, very pure nanocrystalline barium titanate was obtained with no barium carbonate impurity phase. This was confirmed by the nearly complete disappearance of $BaCO_3$ witherite peaks in the RTXRD spectrum of the barium titanate sample (FIG. 11).

Crystalline size inside the barium titanate microsphere particles was determined by using the Scherrer formula: d=0.9θ/B $cosθ_B$ where d is the crystallite size, θ is the wavelength of CuKα radiation (0.15406 nm, when Kα is subtracted), and $θ_B$ is the diffraction angle. Analyses of the X-ray diffraction peaks for various samples showed that crystallite size is approximately 20 to 40 nm for all samples reported in this work. Such nanocrystalline microspheres of barium titanate may offer properties for special applications.

While there has been shown and described what are at present considered the preferred embodiments of the invention, it will be obvious to those skilled in the art that various changes and modifications can be made therein, without departing from the scope of the invention defined by the appended claims.

What is claimed is:

1. A method for producing monodispersed barium titanate microsphere particles comprising the steps of:
 a) providing an aqueous solution of a titanium precursor material at a pH of less than or equal to 5, said titanium precursor material having an initial concentration in the range from about 0.01 M to about 1.0 M;
 b) providing an aqueous solution of a stearic dispersant;
 c) mixing said aqueous solution of said titanium precursor material and said aqueous solution of said stearic dispersant with an alcohol to form a suspension of titania particles, wherein said stearic dispersant is in a sufficient amount and at a sufficient concentration so to contact said titania microsphere particles and adsorb onto said particles to aid in said production of said titania microsphere particles and wherein the volume ratio of said alcohol to aqueous part is in the range of 2 to 4;
 d) incubating in an oven said suspension at a temperature in the range from about 25° C. to about 100° C. for a sufficient time period so to allow for the formation and precipitation of uniform, monodispersed titania microspheres wherein said microspheres having a particular size determined by said initial concentration of said titanium precursor material, said volume ratio of alcohol to aqueous part, said incubation temperature and said incubation time;
 e) cooling said suspension to room temperature;
 f) neutralizing said suspension to chemically stabilize said titania microsphere particles;
 g) washing said titania microsphere particles with water to remove impurities in said suspension;
 h) adding a predetermined amount of barium hydroxide octahydrate to said suspension of titania microsphere particles to initiate a barium titanate-forming process while forming a barium titanate suspension, said barium hydroxide octahydrate is in an amount predetermined to give an initial barium, titanium ratio of 1, and wherein said suspension having a pH value after said addition of said barium hydroxide octahydrate is in the range from about 10 to about 12; and
 i) incubating in an oven said barium titanate suspension of step (h) at a temperature of less than or equal to 100° C. for a sufficient time period so to complete said barium titanate-forming process to hydrothermally convert said titania microsphere particles in said barium titanate suspension to crystalline barium titanate microsphere particles.

2. The method of claim 1 wherein said titanium precursor material is titanium tetrachloride.

3. The method of claim 2 wherein said initial concentration of said titanium tetrachloride is 0.2 M, said concentration of said aqueous solution of said stearic dispersant is 0.002 g/cm$^3$, said volume ratio of said alcohol to aqueous part is 2, said incubation temperature of step (d) and step (i) is 100° C., said incubation time of step (d) and step (i) is 24 hours and said alcohol is isopropanol.

4. The method of claim 1 wherein said stearic dispersant is hydroxypropylcellulose.

5. The method of claim 1 wherein said alcohol is isopropanol.

6. A method for producing barium titanate microsphere powder comprising steps 1(a) through step 1(i) according to claim 1, and further comprising the steps of:
 j) adding a sufficient amount of formic acid to said barium titanate suspension having said crystaline barium titanate microsphere particles in an amount sufficient to reduce the barium carbonate impurity level in said suspension;
 k) washing said barium titanate suspension with water to remove impurities in said suspension;
 l) removing said water from said suspension to obtain said barium titanate microsphere particles; and
 m) air drying said barium titanate microsphere particles to form a dried crystalline barium titanate microsphere powder.

* * * * *